United States Patent
Ma et al.

(10) Patent No.: US 11,722,939 B2
(45) Date of Patent: Aug. 8, 2023

(54) RECONFIGURATION METHOD, NETWORK DEVICE, AND TERMINAL

(71) Applicant: VIVO MOBILE COMMUNICATION CO., LTD., Guangdong (CN)

(72) Inventors: Yue Ma, Chang'an Dongguan (CN); Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 66 days.

(21) Appl. No.: 17/037,240

(22) Filed: Sep. 29, 2020

(65) Prior Publication Data

US 2021/0014758 A1 Jan. 14, 2021

Related U.S. Application Data

(63) Continuation of application No. PCT/CN2019/077797, filed on Mar. 12, 2019.

(30) Foreign Application Priority Data

Mar. 30, 2018 (CN) .......................... 201810294472.0

(51) Int. Cl.
*H04W 36/08* (2009.01)
*H04W 76/25* (2018.01)
(Continued)

(52) U.S. Cl.
CPC ....... *H04W 36/08* (2013.01); *H04W 36/0058* (2018.08); *H04W 36/0088* (2013.01);
(Continued)

(58) Field of Classification Search
CPC ............. H04W 36/36; H04W 36/0033; H04W 36/00837; H04W 36/08; H04W 36/0058; H04W 36/0088; H04W 36/0094; H04W 36/30; H04W 76/25; H04W 76/27; H04W 24/02; H04L 41/0813; H04L 41/0816
See application file for complete search history.

(56) References Cited

U.S. PATENT DOCUMENTS

| | | |
|---|---|---|
| 2013/0094467 A1 | 4/2013 | Kwon et al. |
| 2016/0135174 A1 | 5/2016 | Lee et al. |

(Continued)

FOREIGN PATENT DOCUMENTS

| | | |
|---|---|---|
| CN | 104202779 A | 12/2014 |
| CN | 107113673 A | 8/2017 |
| CN | 107690163 A | 2/2018 |

OTHER PUBLICATIONS

EP Search Report in Application No. 19776448.3 dated Apr. 26, 2021.

(Continued)

*Primary Examiner* — Nam T Huynh
(74) *Attorney, Agent, or Firm* — Maschoff Brennan (57) ABSTRACT

A reconfiguration method, a network device, and a terminal are provided. The reconfiguration method in this disclosure includes: sending, by a first network node, a reconfiguration request of cell change configuration information to a second network node; and obtaining, by the first network node, a reconfiguration response sent by the second network node based on the reconfiguration request.

13 Claims, 6 Drawing Sheets

(51) Int. Cl.
  *H04W 76/27* (2018.01)
  *H04W 36/00* (2009.01)
  *H04W 36/30* (2009.01)
  *H04W 36/36* (2009.01)

(52) U.S. Cl.
  CPC ....... *H04W 36/0094* (2013.01); *H04W 36/30* (2013.01); *H04W 36/36* (2013.01); *H04W 76/25* (2018.02); *H04W 76/27* (2018.02); *H04W 36/00837* (2018.08)

(56) References Cited

U.S. PATENT DOCUMENTS

2018/0227805 A1* 8/2018 Jang ................... H04W 28/0278
2019/0289528 A1* 9/2019 Lou .................... H04L 41/5041
2020/0045602 A1   2/2020 Jiang
2020/0396652 A1* 12/2020 Decarreau ............. H04W 36/36

OTHER PUBLICATIONS

"Conditional Handover" 3GPP TSG-RAN WG2 NRAH#1801, Ericsson, R2-1801329, Jan. 22, 2018.
"Introduction of Conditional handover" 3GPP TSG-RAN2#101, Samsung, R2-1802486, Feb. 26, 2018.
"Conditional Handover" 3GPP TSG-RAN WG2 #101, Ericsson, R2-1803336, Feb. 26, 2018.
"Configuration Management for Conditional Handover" 3GPP TSG-RAN WG2 Meeting #101, R2-1803347, Feb. 26, 2018.
Written Opinion and International Search Report in Application No. PCT/CN2019/077797 dated Oct. 15, 2020.
European Office Action issued in corresponding application No. 19776448.3, dated Oct. 10, 2022.

* cited by examiner

RECONFIGURATION METHOD, NETWORK DEVICE, AND TERMINAL

CROSS-REFERENCE TO RELATED APPLICATIONS

This application is a continuation application of a PCT Application No. PCT/CN2019/077797 filed on Mar. 12, 2019, which claims priority to Chinese Patent Application No. 201810294472.0, filed in China on Mar. 30, 2018, the disclosures of which are incorporated in their entireties by reference herein.

TECHNICAL FIELD

This disclosure relates to the technical field of communication application, and in particular, to a reconfiguration method, a network device, and a terminal.

BACKGROUND

In a 5G system, user equipment (User Equipment, UE for short) uses a dual connectivity (Dual Connectivity, DC for short) architecture. The DC architecture includes two cell groups: a master cell group (Master Cell Group, MCG for short) and a secondary cell group (Secondary Cell Group, SCG for short). The MCG is corresponding to a master node (Master Node, MN for short) on a network side, and the SCG is corresponding to a secondary node (SN) on the network side. The MCG includes a primary cell of the master cell group (Primary Cell, PCell) and a secondary cell of the master cell group (Secondary Cell, SCell). The SCG includes a primary cell of the secondary cell group (Primary SCell, PSCell) and a secondary cell of the secondary cell group (Secondary Cell, SCell). The PCell and the PSCell may be collectively referred to as SpCell.

In 5G technologies, study of conditional handover (Conditional Handover) has already started. During the conditional handover, the UE no longer performs handover immediately after receiving a handover command Instead, the UE performs handover only when the requirements carried in the handover command are met. However, there is still no relevant design on how to change or cancel cell change configuration information after a source node informs a target node of the cell change configuration information.

SUMMARY

This disclosure is intended to provide a reconfiguration method, a network device, and a terminal, to provide a relevant design on how to change or cancel cell change configuration information after a source node informs a target node of the cell change configuration information.

According to a first aspect, an embodiment of this disclosure provides a reconfiguration method, including:
sending, by a first network node, a reconfiguration request of cell change configuration information to a second network node; and
obtaining, by the first network node, a reconfiguration response sent by the second network node based on the reconfiguration request.

According to a second aspect, an embodiment of this disclosure provides a reconfiguration method, including:
receiving a reconfiguration message of cell change configuration information that is sent by a source node; and
sending a reconfiguration complete message to the source node.

According to a third aspect, an embodiment of this disclosure provides a network device, including:
a first sending module, configured to send a reconfiguration request of cell change configuration information to a second network node; and
an obtaining module, configured to obtain a reconfiguration response sent by the second network node based on the reconfiguration request.

According to a fourth aspect, an embodiment of this disclosure provides a network device, including: a memory, a processor, and a computer program that is stored in the memory and capable of running on the processor, where when the computer program is executed by the processor, the steps of the foregoing reconfiguration method are implemented.

According to a fifth aspect, an embodiment of this disclosure further provides a terminal, including:
a first receiving module, configured to receive a reconfiguration message of cell change configuration information that is sent by a first network node; and
a second sending module, configured to send a reconfiguration complete message to the source node.

According to a sixth aspect, an embodiment of this disclosure further provides a terminal, including: a memory, a processor, and a computer program that is stored in the memory and capable of running on the processor, where when the computer program is executed by the processor, the steps of the foregoing reconfiguration method are implemented.

According to a seventh aspect, an embodiment of this disclosure further provides a computer-readable storage medium, the computer-readable storage medium storing a computer program, where when the computer program is executed by a processor, the steps of the foregoing reconfiguration method are implemented.

The embodiments of this disclosure have the following beneficial effects:

In the embodiments of this disclosure, the first network node sends the reconfiguration request of cell change configuration information to the second network node; and the first network node obtains the reconfiguration response sent by the second network node based on the reconfiguration request, so that the first network node can reconfigure the cell change configuration information for the terminal based on the reconfiguration response. To be specific, even after a conditional cell change configuration, the network can still implement configuration change, deletion, and the like.

DESCRIPTION OF DRAWINGS

To describe the technical solutions in the embodiments of this disclosure more clearly, the following briefly describes the drawings required for describing the embodiments of this disclosure. Apparently, the drawings described below are only some of the embodiments of this disclosure. A person of ordinary skill in the art can obtain other drawings based on these drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are merely some but not all of the embodiments of this disclosure. Based on the embodiments of this disclosure, all other embodiments derived by persons of ordinary skill in the art without creative efforts fall within the protection scope of this disclosure. The expression "and/or" used in the claims and the specification indicates at least one of the associated objects.

Figure 1:
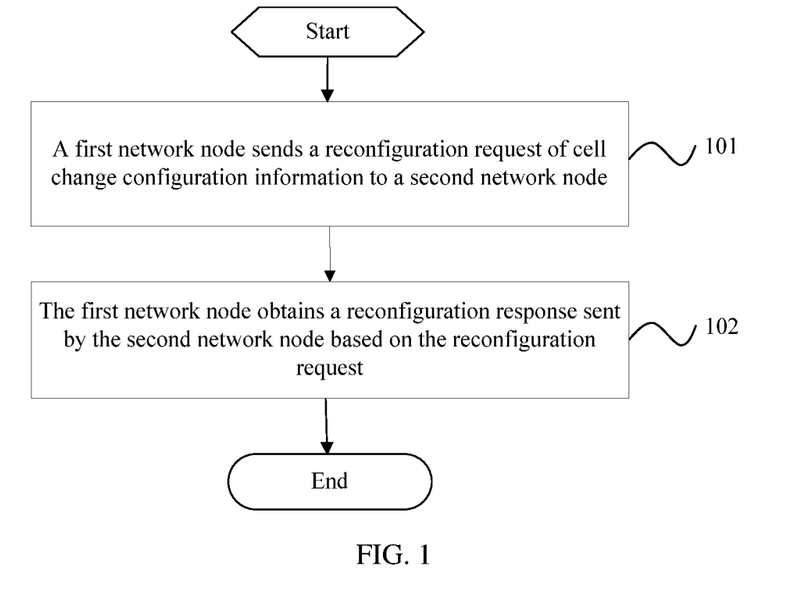
FIG. 1 is a first schematic flowchart of a reconfiguration method according to an embodiment of this disclosure.

FIG. 1 is a schematic flowchart of a reconfiguration method according to an embodiment of this disclosure. As shown in FIG. 1, the reconfiguration method in this embodiment of this disclosure is applied to a network device, the network device may specifically be a base station, and the reconfiguration method includes the following steps.

Step 101: A first network node sends a reconfiguration request of cell change configuration information to a second network node.

In this embodiment of this disclosure, the first network node may be a source node or a target node, and the second network node may also be a source node or a target node. When the first network node is the source node, the second network node includes at least one target node; or when the first network node is the target node, the second network node is the source node.

The source node and the target node can be a source base station and a target base station in a handover process, or a source SN and a target SN in DC, or a source MN and a target MN in DC, or the handover process may be joint handover between an MN and an SN in DC, or handover or SN handover in the case of carrier aggregation.

The cell change configuration information includes at least one of the following items:

a trigger condition;

an association relationship between a trigger condition, a cell identifier, measurement, and a cell change command; and measurement configuration.

The reconfiguration request includes a change request, a deletion request, or an addition request of cell change configuration information.

Step 102: The first network node obtains a reconfiguration response sent by the second network node based on the reconfiguration request.

When the reconfiguration request is a change request of cell change configuration information, the reconfiguration response includes at least one of: accepting change, not accepting change, accepting part of requested change, not accepting part of requested change, a cause value, and accepting unconditionally; or when the reconfiguration request is a deletion request of cell change configuration information, the reconfiguration response includes at least one of: accepting deletion, not accepting deletion, accepting part of requested deletion, not accepting part of requested deletion, a cause value, and accepting unconditionally.

In this embodiment of this disclosure, when the first network node is the source node, the second network node includes at least one target node; or when the first network node is the target node, the second network node is the source node. In this embodiment of this disclosure, a reconfiguration process of the cell change configuration information may be triggered by the source node or the target node.

When the reconfiguration process of the cell change configuration information is triggered by the source node, the source node sends the foregoing reconfiguration request to the target node, and the target node sends a reconfiguration response to the source node based on the reconfiguration request sent by the source node.

Alternatively, when the reconfiguration process of the cell change configuration information is triggered by the target node, the target node sends the foregoing reconfiguration request to the source node, and the source node sends a reconfiguration response to the target node based on the reconfiguration request sent by the target node.

In the reconfiguration method in this embodiment of this disclosure, the first network node sends the reconfiguration request of cell change configuration information to the second network node; and the first network node obtains the reconfiguration response sent by the second network node based on the reconfiguration request, so that the first network node can reconfigure the cell change configuration information for the terminal based on the reconfiguration response. To be specific, even after a conditional cell change configuration, the network can still implement configuration change, deletion, and the like.

Optionally, before step 102 of obtaining, by the first network node, a reconfiguration response sent by the second network node based on the reconfiguration request, the reconfiguration method in this embodiment of this disclosure further includes:

sending, by the first network node, a reconfiguration instruction message of cell change configuration information to a terminal, where the reconfiguration instruction message is used to instruct the terminal to delete or change current cell change configuration information.

The reconfiguration instruction message is sent to the terminal, to instruct the terminal to change or delete the current cell change configuration information. The terminal may delete the current cell change configuration information based on the reconfiguration instruction message; or suspend current measurement.

Specifically, when the reconfiguration request is a deletion request of cell change configuration information, the terminal deletes the current cell change configuration information; or when the reconfiguration request is a change request of cell change configuration information and the content that is requested to be changed is unrelated to content for performing cell change, the terminal suspends the current measurement; or when the reconfiguration request is a change request of cell change configuration information and the content that is requested to be changed is related to content for performing cell change, the terminal deletes the current cell change configuration information.

Further, when the first network node is a source node and the second network node is a target node, after step 102 of obtaining, by the first network node, a reconfiguration response sent by the second network node based on the reconfiguration request, the method further includes:

sending, by the first network node, a reconfiguration message of cell change configuration information to a terminal based on the reconfiguration response.

In this embodiment of this disclosure, the source node reconfigures the cell change configuration information for the terminal based on the reconfiguration response.

Specifically, when the reconfiguration response includes accepting change or accepting part of requested change, the first network node sends the reconfiguration message of cell change configuration information to the terminal; or when the reconfiguration response includes accepting deletion or accepting part of requested deletion, the first network node sends the reconfiguration message of cell change configuration information to the terminal.

The reconfiguration message includes at least one of the following items:

at least one cell change command;
condition configuration information;
a cell identifier; and
an association relationship between the cell identifier, the condition configuration information, and the cell change command.

Further, after the step of sending, by the first network node, a reconfiguration message of cell change configuration information to the terminal, the method further includes:

after receiving a reconfiguration complete message sent by the terminal, notifying, by the first network node, the second network node of reconfiguration completion of the cell change configuration information.

In this embodiment of this disclosure, after receiving the reconfiguration message sent by the source node, the terminal initiates synchronization and random access RACH processes to the first target node, and after successful access, the terminal sends a reconfiguration complete message to the first network node. After receiving the reconfiguration complete message, the source node notifies the first target node of reconfiguration completion of the cell change configuration information.

Further, when the reconfiguration message includes at least one cell change command, the reconfiguration complete message includes an indication of reconfiguration completion for the reconfiguration message and validity of the cell change command.

Further, the second network node includes a first target node and a second target node; and after the notifying the second network node of reconfiguration completion of the cell change configuration information, the method further includes:

sending, by the first network node, a resource release notification to the second target node when receiving a notification that the terminal meets a trigger condition of the cell change, where the trigger condition of the cell change is a trigger condition of a preset cell of the first target node; or sending, by the first network node, a resource release notification to the second target node after receiving an indication from the first target node that the terminal successfully accesses a target cell, where the resource release notification is used to instruct the second target node to release a resource corresponding to target configuration information; and the target configuration information is configuration information other than executed configuration information in the cell change configuration information of the terminal.

When the UE meets a preset cell change condition, and in other words, the UE is ready to execute the previously delivered cell change command, the terminal notifies the source node that the UE meets a preset cell change trigger condition and is about to execute a corresponding handover command. The source node will request all related target nodes to release a resource and cancel an untriggered configuration with respect to all other related configurations (except an executed configuration) of the UE.

Alternatively, after successfully accessing the target cell, the terminal sends a handover complete message to the target node. The target node notifies the source node of a successful access indication of the UE. After learning that the UE has successfully performed cell change, the source node will request all related target nodes to release a resource and cancel an untriggered configuration with respect to all other related configurations (except an executed configuration) of UE.

Herein, after completing handover, the terminal releases corresponding resources to avoid a waste of network resources caused by placement of resources.

In the reconfiguration method in this embodiment of this disclosure, the first network node sends the reconfiguration request of cell change configuration information to the second network node; and the first network node obtains the reconfiguration response sent by the second network node based on the reconfiguration request, so that the first network node can reconfigure the cell change configuration information for the terminal based on the reconfiguration response. To be specific, even after a conditional cell change configuration, the network can still implement configuration change, deletion, and the like.

It is assumed that the first network node is the source node and the source node triggers a reconfiguration procedure of the cell change configuration information. The interaction procedure of the source node, a target node 1, a target node 2, and the terminal is described below with reference to FIG. 2A and FIG. 2B.

Figure 2A:
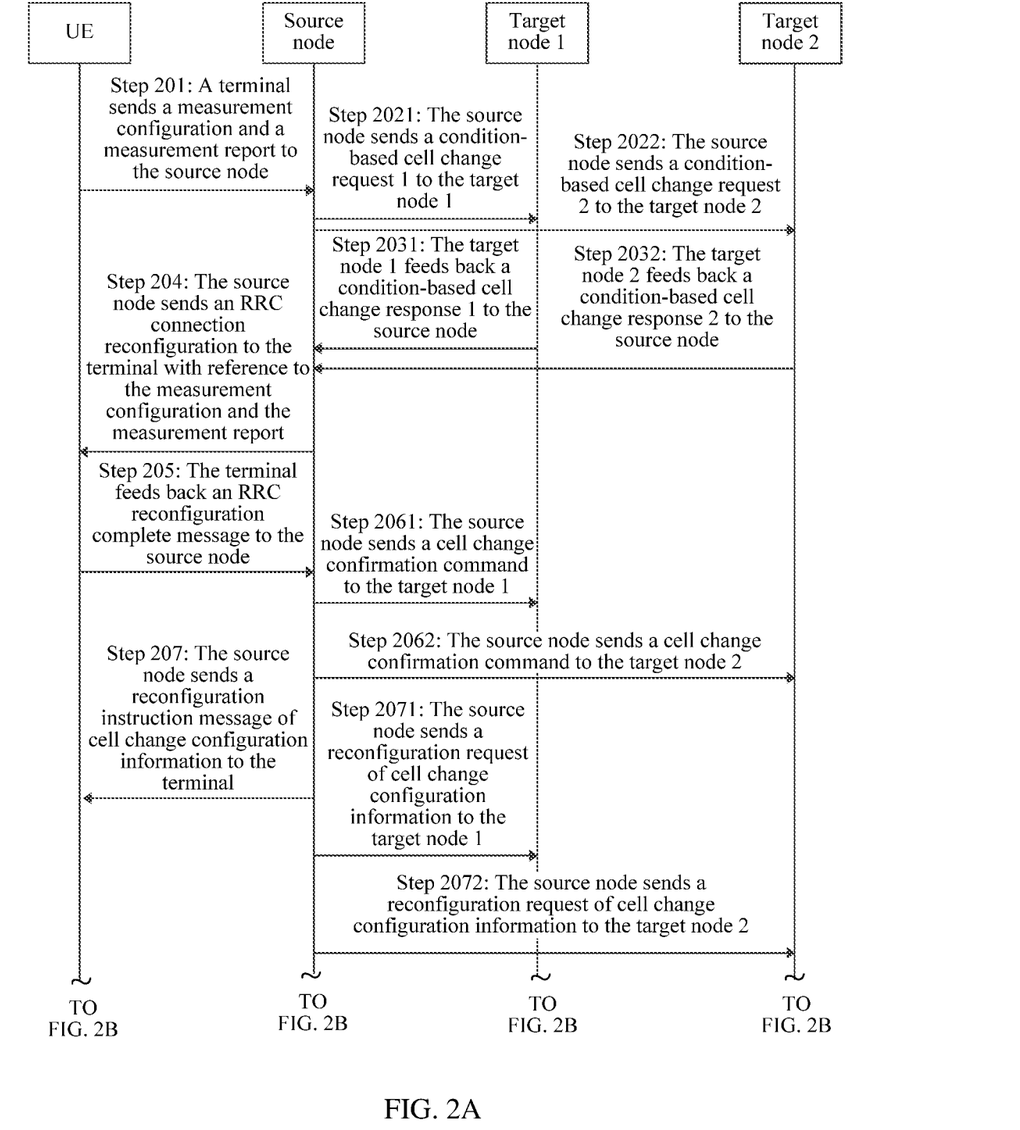
FIG. 2A and FIG. 2B are a flowchart of interaction among a terminal, a source node, and a target node according to an embodiment of this disclosure.
Figure 2B:
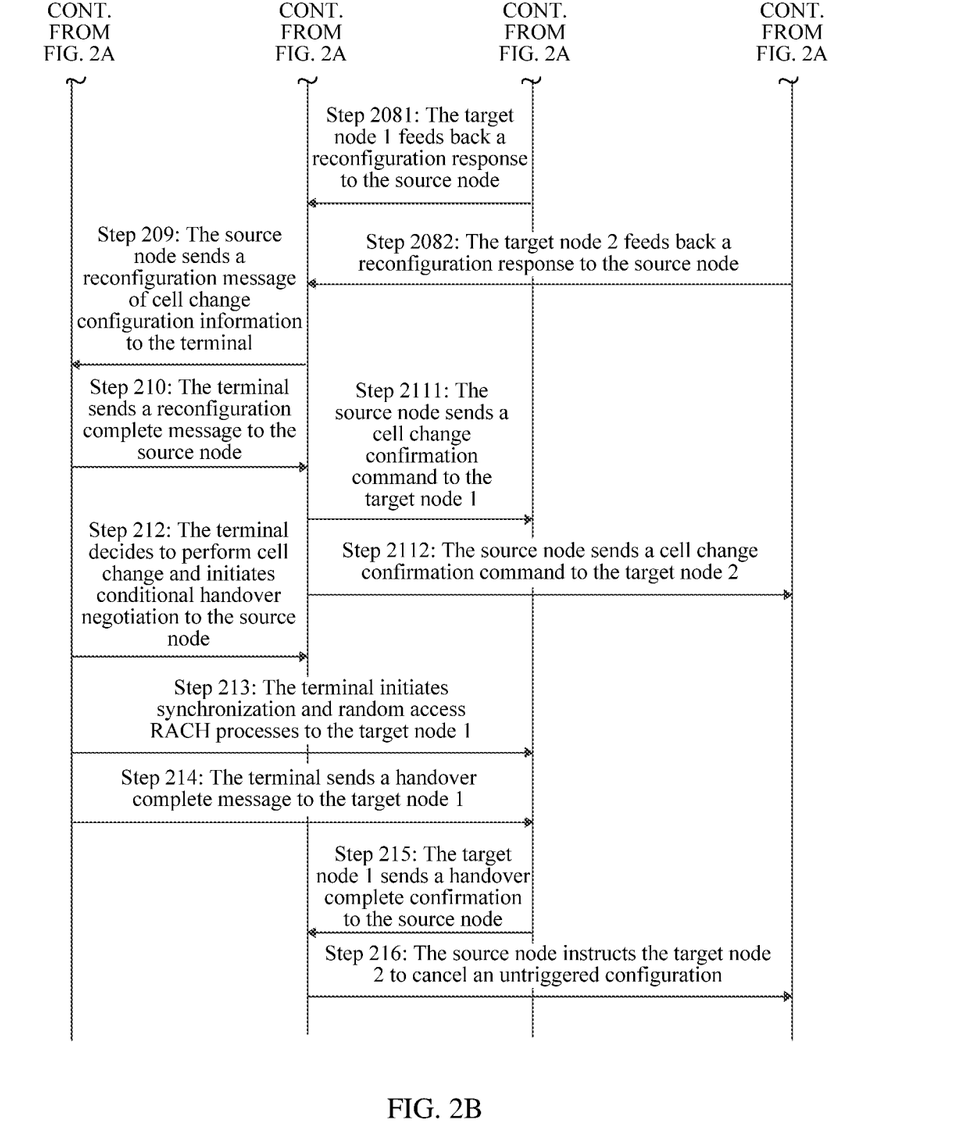

As shown in FIG. 2A and FIG. 2B, the interaction procedure includes the following steps:

Step 201: A terminal sends a measurement configuration and a measurement report to a source node.

Step 2021: The source node sends a condition-based cell change request 1 to a target node 1.

Step 2022: The source node sends a condition-based cell change request 2 to a target node 2.

Step 2031: The target node 1 feeds back a condition-based cell change response 1 to the source node.

Step 2032: The target node 2 feeds back a condition-based cell change response 2 to the source node.

Step 204: The source node sends an RRC connection reconfiguration to the terminal with reference to the measurement configuration and the measurement report.

The RRC connection reconfiguration includes one or more handover commands or conditions.

Step 205: The terminal feeds back an RRC reconfiguration complete message to the source node.

Step 2061: The source node sends a cell change confirmation command to the target node 1.

Step 2062: The source node sends a cell change confirmation command to the target node 2.

It should be noted that steps 201 to 2062 are a process in which the terminal completes condition-based cell change, and a subsequent procedure is a procedure in which the terminal changes or deletes the cell change configuration information after completing the condition-based cell change process.

Step 207: The source node sends a reconfiguration instruction message of cell change configuration information to the terminal.

Step 2071: The source node sends a reconfiguration request of cell change configuration information to the target node 1.

The reconfiguration request includes a change request or a deletion request of cell change configuration information.

Step 2072: The source node sends a reconfiguration request of cell change configuration information to the target node 2.

Step 2081: The target node 1 feeds back a reconfiguration response to the source node.

Step 2082: The target node 2 feeds back a reconfiguration response to the source node.

Step 209: The source node sends a reconfiguration message of cell change configuration information to the terminal.

The reconfiguration message may include one or more handover commands or conditions.

Step 210: The terminal sends a reconfiguration complete message to the source node.

Step 2111: The source node sends a cell change confirmation command to the target node 1.

Step 2112: The source node sends a cell change confirmation command to the target node 2.

Steps 207 to 2112 are a configuration renegotiation process.

Step 212: The terminal decides to perform cell change and initiates conditional handover negotiation to the source node.

Step 213: The terminal initiates synchronization and random access RACH processes to the target node 1.

Step 214: The terminal sends a handover complete message to the target node 1.

Step 215: The target node 1 sends a handover complete confirmation to the source node.

Step 216: The source node instructs the target node 2 to cancel an untriggered configuration.

Steps 212 to 216 are a negotiation process following execution of the cell change configuration information.

In the reconfiguration method in this embodiment of this disclosure, the network can still implement configuration change, deletion, an addition, and the like after the conditional cell change configuration, and release the corresponding resource after the UE completes the handover, to avoid a waste of network resources caused by resource reservation.

Figure 3:
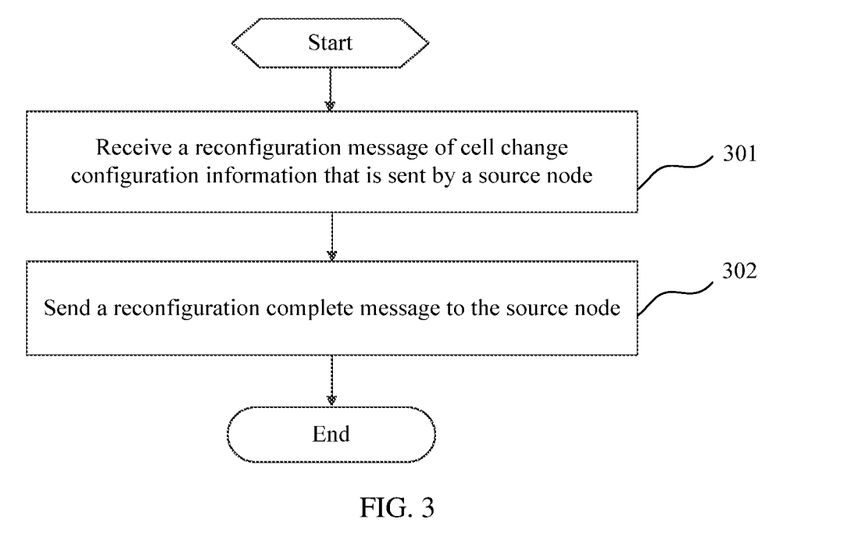
FIG. 3 is a second schematic flowchart of a reconfiguration method according to an embodiment of this disclosure.

FIG. 3 is a schematic flowchart of a reconfiguration method according to an embodiment of this disclosure. As shown in FIG. 3, the reconfiguration method in this embodiment of this disclosure is applied to a terminal, and the reconfiguration method includes the following steps.

Step 301: Receive a reconfiguration message of cell change configuration information that is sent by a source node.

The reconfiguration message is sent by the source node based on a reconfiguration response sent by a target node, and the reconfiguration response is sent by the target node based on a reconfiguration request of cell change configuration information that is sent by the source node.

Step 302: Send a reconfiguration complete message to the source node.

The reconfiguration request includes a change request, a deletion request, or an addition request of cell change configuration information.

When the reconfiguration request is a change request of cell change configuration information, the reconfiguration response includes at least one of: accepting change, not accepting change, accepting part of requested change, not accepting part of requested change, a cause value, and accepting unconditionally; or when the reconfiguration request is a deletion request of cell change configuration information, the reconfiguration response includes at least one of: accepting deletion, not accepting deletion, accepting part of requested deletion, not accepting part of requested deletion, a cause value, and accepting unconditionally.

The reconfiguration message includes at least one of the following items:

at least one cell change command;
condition configuration information;
a cell identifier; and
an association relationship between the cell identifier, the condition configuration information, and the cell change command.

In the reconfiguration method in this embodiment of this disclosure, the source node sends the reconfiguration message to the terminal. In this way, the network can still implement configuration change, deletion, an addition, and the like after the conditional cell change configuration.

Further, before step 301, the method further includes:

receiving a reconfiguration instruction message of cell change configuration information that is sent by a source node or a target node.

The reconfiguration instruction message is used to instruct the terminal to delete or change current cell change configuration information.

After the receiving a reconfiguration instruction message of cell change configuration information that is sent by a source node, the method further includes:

deleting the current cell change configuration information; or suspending current measurement.

Specifically, when the reconfiguration request is a deletion request of cell change configuration information, the terminal deletes the current cell change configuration information; or when the reconfiguration request is a change request of cell change configuration information and the content that is requested to be changed is unrelated to content for performing cell change, the terminal suspends the current measurement; or when the reconfiguration request is a change request of cell change configuration information and the content that is requested to be changed is related to content for performing cell change, the terminal deletes the current cell change configuration information.

The reconfiguration instruction message is sent to the terminal, to instruct the terminal to change or delete the current cell change configuration information. The terminal may delete the current cell change configuration information based on the reconfiguration instruction message; or suspend current measurement.

Further, the reconfiguration message includes at least one cell change command; and the reconfiguration complete message includes an indication of reconfiguration completion for the reconfiguration message and validity of the cell change command.

When the reconfiguration message includes at least one cell change command, after the reconfiguration complete message is sent to the source node, the method further includes:

when a trigger condition of cell change is met, initiating a synchronization process and a random access process to a first target node based on the cell change command, where the trigger condition of the cell change is a trigger condition of a preset cell of the first target node.

In this embodiment of this disclosure, an interaction process between the terminal, the source node, and the target node is described in detail in the foregoing reconfiguration method applied to the network side. Details are not repeatedly described herein.

In the reconfiguration method in this embodiment of this disclosure, the first network node sends the reconfiguration message to the terminal. In this way, the network can still implement configuration change, deletion, an addition, and the like after the conditional cell change configuration.

Figure 4:
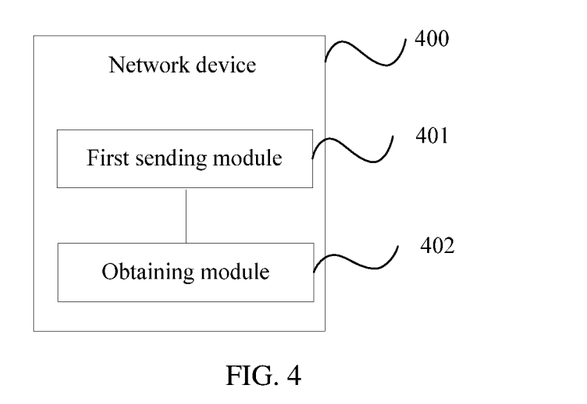
FIG. 4 is a schematic diagram of modules of a network device according to an embodiment of this disclosure.

As shown in FIG. 4, an embodiment of this disclosure further provides a network device 400, including:

a first sending module 401, configured to send a reconfiguration request of cell change configuration information to a second network node; and an obtaining module 402, configured to obtain a reconfiguration response sent by the second network node based on the reconfiguration request.

The network device in this embodiment of this disclosure further includes:

a third sending module, configured to send a reconfiguration instruction message of cell change configuration information to a terminal, where the reconfiguration instruction message is used to instruct the terminal to delete or change current cell change configuration information.

For the network device in this embodiment of this disclosure, the cell change configuration information includes at least one of the following items:

a trigger condition;

an association relationship between a trigger condition, a cell identifier, measurement, and a cell change command; and measurement configuration.

For the network device in this embodiment of this disclosure, when the first network node is the source node and the second network node includes at least one target node, the network device further includes:

a fourth sending module, configured to send a reconfiguration message of cell change configuration information to the terminal based on the reconfiguration response.

For the network device in this embodiment of this disclosure, the reconfiguration request includes:

a change request or a deletion request of cell change configuration information.

For the network device in this embodiment of this disclosure, when the reconfiguration request is a change request of cell change configuration information, the reconfiguration response includes at least one of: accepting change, not accepting change, accepting part of requested change, not accepting part of requested change, a cause value, and accepting unconditionally; or when the reconfiguration request is a deletion request of cell change configuration information, the reconfiguration response includes at least one of: accepting deletion, not accepting deletion, accepting part of requested deletion, not accepting part of requested deletion, a cause value, and accepting unconditionally.

For the network device in this embodiment of this disclosure, the fourth sending module is configured to: when the reconfiguration response includes accepting change or accepting part of requested change, send a reconfiguration message of cell change configuration information to the terminal; or when the reconfiguration response includes accepting deletion or accepting part of requested deletion, send a reconfiguration message of cell change configuration information to the terminal.

For the network device in this embodiment of this disclosure, the reconfiguration message includes at least one of the following items:

at least one cell change command;

condition configuration information;

a cell identifier; and an association relationship between the cell identifier, the condition configuration information, and the cell change command.

The network device in this embodiment of this disclosure further includes:

a notification module, configured to: after the first network node receives a reconfiguration complete message sent by the terminal, notify the second network node of reconfiguration completion of the cell change configuration information.

For the network device in this embodiment of this disclosure, when the reconfiguration message includes at least one cell change command, the reconfiguration complete message includes an indication of reconfiguration completion for the reconfiguration message and validity of the cell change command.

For the network device in this embodiment of this disclosure, the second network node includes a first target node and a second target node, and the network device further includes:

a fifth sending module, configured to: send a resource release notification to the second target node when receiving a notification that the terminal meets a trigger condition of the cell change, where the trigger condition of the cell change is a trigger condition of a preset cell of the first target node; or send a resource release notification to the second target node after receiving an indication from the first target node that the terminal successfully accesses a target cell, where the resource release notification is used to instruct the second target node to release a resource corresponding to target configuration information; and the target configuration information is configuration information other than executed configuration information in the cell change configuration information of the terminal.

The network device in this embodiment of this disclosure sends the reconfiguration request of cell change configuration information to the second network node; and obtains the reconfiguration response sent by the second network node based on the reconfiguration request, so that the first network node can reconfigure the cell change configuration information for the terminal based on the reconfiguration response. To be specific, even after a conditional cell change configuration, the network can still implement configuration change, deletion, and the like.

An embodiment of this disclosure further provides a network device, including: a memory, a processor, and a computer program that is stored in the memory and capable of running on the processor, where when the computer program is executed by the processor, the processes of the method embodiments of the foregoing reconfiguration method applied to the network device are implemented, and the same technical effects can be achieved. To avoid repetition, details are not described herein again.

An embodiment of this disclosure further provides a computer-readable storage medium. The computer-readable storage medium stores a computer program, and when the computer program is executed by a processor, the processes of the method embodiments of the foregoing reconfiguration method applied to the network device are implemented, and the same technical effects can be achieved. To avoid repetition, details are not described herein again. The computer-readable storage medium includes a read-only memory (Read-Only Memory, ROM for short), a random access memory (Random Access Memory, RAM for short), a magnetic disk, an optical disc, or the like.

Figure 5:
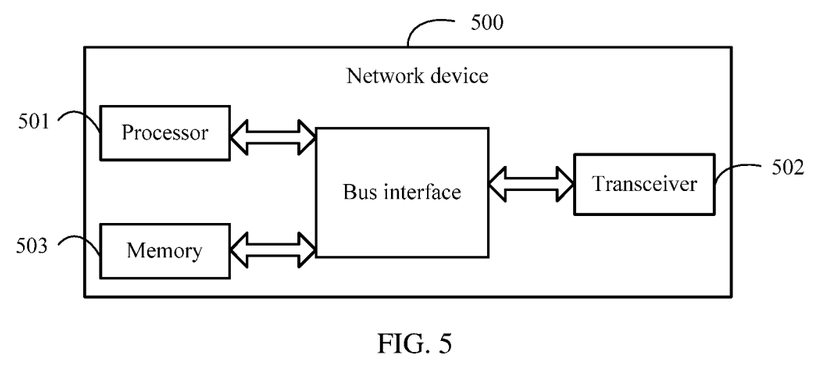
FIG. 5 is a structural block diagram of a network device according to an embodiment of this disclosure.

As shown in FIG. 5, an embodiment of this disclosure further provides a network device 500, including a processor 501, a transceiver 502, a memory 503 and a bus interface.

The processor 501 is configured to read a program in the memory 503 to perform the following process:

sending a reconfiguration request of cell change configuration information to a second network node; and obtaining a reconfiguration response sent by the second network node based on the reconfiguration request.

In FIG. 5, a bus architecture may include any quantity of interconnected buses and bridges, and specifically connect together various circuits of one or more processors represented by the processor 501 and a memory represented by the memory 503. The bus architecture may further connect, for example, a peripheral or a voltage stabilizer to various other circuits such as a power management circuit. These are well known in the art, and therefore are not further described in this specification. The bus interface provides an interface. The transceiver 502 may be a plurality of elements, including a transmitter and a receiver, and provides units configured to communicate with various other apparatuses over a transmission medium.

The processor 501 is responsible for management of the bus architecture and general processing, and the memory 503 may store data used by the processor 501 when the processor 501 performs an operation.

Optionally, the processor 501 reads the program in the memory 503 and is further configured to:

send a reconfiguration instruction message of cell change configuration information to a terminal, where the reconfiguration instruction message is used to instruct the terminal to delete or change current cell change configuration information.

Optionally, the cell change configuration information includes at least one of the following items:

a trigger condition;

an association relationship between a trigger condition, a cell identifier, measurement, and a cell change command; and measurement configuration.

Optionally, the processor 501 reads the program in the memory 503 and is further configured to:

send a reconfiguration message of cell change configuration information to a terminal based on the reconfiguration response.

Optionally, the reconfiguration request includes:

a change request or a deletion request of cell change configuration information.

Optionally, when the reconfiguration request is a change request of cell change configuration information, the reconfiguration response includes at least one of: accepting change, not accepting change, accepting part of requested change, not accepting part of requested change, a cause value, and accepting unconditionally; or when the reconfiguration request is a deletion request of cell change configuration information, the reconfiguration response includes at least one of: accepting deletion, not accepting deletion, accepting part of requested deletion, not accepting part of requested deletion, a cause value, and accepting unconditionally.

Optionally, the processor 501 reads the program in the memory 503 and is further configured to:

when the reconfiguration response includes accepting change or accepting part of requested change, send a reconfiguration message of cell change configuration information to the terminal; or when the reconfiguration response includes accepting deletion or accepting part of requested deletion, send a reconfiguration message of cell change configuration information to the terminal.

Optionally, the reconfiguration message includes at least one of the following items:

at least one cell change command;

condition configuration information;

a cell identifier; and an association relationship between the cell identifier, the condition configuration information, and the cell change command.

Optionally, the processor 501 reads the program in the memory 503 and is further configured to:

after receiving a reconfiguration complete message sent by the terminal, notify the second network node of reconfiguration completion of the cell change configuration information.

Optionally, when the reconfiguration message includes at least one cell change command, the reconfiguration complete message includes an indication of reconfiguration completion for the reconfiguration message and validity of the cell change command.

Optionally, the second network node includes a first target node and a second target node.

Optionally, the processor 501 reads the program in the memory 503 and is further configured to:

send a resource release notification to the second target node when receiving a notification that the terminal meets a trigger condition of the cell change, where the trigger condition of the cell change is a trigger condition of a preset cell of the first target node; or send a resource release notification to the second target node after receiving an indication from the first target node that the terminal successfully accesses a target cell, where the resource release notification is used to instruct the second target node to release a resource corresponding to target configuration information; and the target configuration information is configuration information other than executed configuration information in the cell change configuration information of the terminal.

In the foregoing solution in this embodiment of this disclosure, the reconfiguration request of cell change configuration information is sent to the second network node; and the reconfiguration response sent by the second network node based on the reconfiguration request is obtained, so that the first network node can reconfigure the cell change configuration information for the terminal based on the reconfiguration response. To be specific, even after a conditional cell change configuration, the network can still implement processes of changing the configuration, deleting the configuration, and the like.

Figure 6:
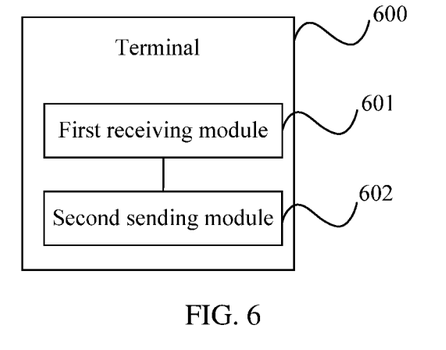
FIG. 6 is a schematic diagram of modules of a terminal according to an embodiment of this disclosure.

FIG. 6 is a schematic diagram of modules of a terminal according to an embodiment of this disclosure. As shown in FIG. 6, this embodiment of this disclosure further provides a terminal 600, including:

a first receiving module 601, configured to receive a reconfiguration message of cell change configuration information that is sent by a first network node; and a second sending module 602, configured to send a reconfiguration complete message to a source node.

The terminal in this embodiment of this disclosure further includes:

a second receiving module, configured to receive a reconfiguration instruction message of cell change configuration information that is sent by the source node or a target node, where the reconfiguration instruction message is used to instruct the terminal to delete or change current cell change configuration information.

The terminal in this embodiment of this disclosure further includes:

a control module, configured to: delete the current cell change configuration information; or suspend current measurement.

For the terminal in this embodiment of this disclosure, the reconfiguration message includes at least one cell change command; and the reconfiguration complete message includes an indication of reconfiguration completion for the reconfiguration message and validity of the cell change command.

For the terminal in this embodiment of this disclosure, the reconfiguration message includes at least one cell change command.

The terminal in this embodiment of this disclosure further includes:

an access module, configured to: when a trigger condition of cell change is met, initiate a synchronization process and a random access process to a first target node based on the cell change command.

Based on the reconfiguration message sent by the first network node, the terminal in this embodiment of this disclosure can still changing, delete, and add configuration after the conditional cell change configuration. The trigger condition of the cell change is a trigger condition of a preset cell of the first target node.

An embodiment of this disclosure further provides a terminal, including: a memory, a processor, and a computer program that is stored in the memory and capable of running on the processor, where when the computer program is executed by the processor, the processes of the foregoing reconfiguration method embodiments applied to the terminal are implemented, and the same technical effects can be achieved. To avoid repetition, details are not described herein again.

An embodiment of this disclosure further provides a computer-readable storage medium. The computer-readable storage medium stores a computer program, and when the computer program is executed by a processor, the processes of the foregoing reconfiguration method embodiments applied to the terminal are implemented, and the same technical effects can be achieved. To avoid repetition, details are not described herein again. The computer-readable storage medium includes a read-only memory (Read-Only Memory, ROM for short), a random access memory (Random Access Memory, RAM for short), a magnetic disk, an optical disc, or the like.

Figure 7:
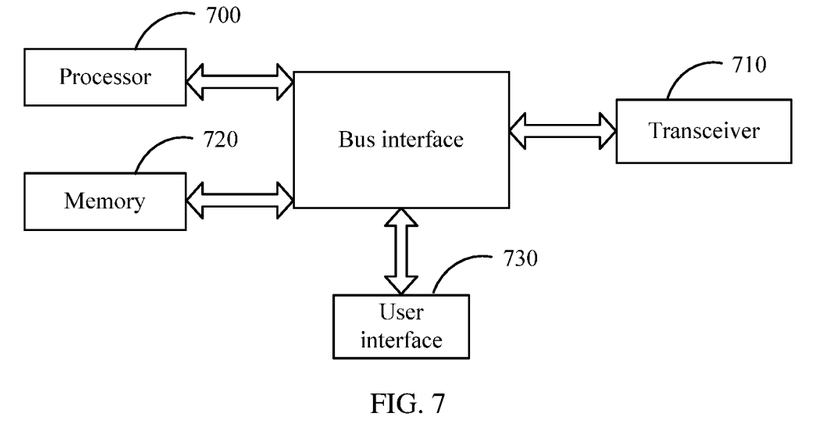
FIG. 7 is a first structural block diagram of a terminal according to an embodiment of this disclosure.

To better achieve the foregoing objective, as shown in FIG. 7, an embodiment of this disclosure further provides a terminal, including a memory 720, a processor 700, a transceiver 710, a user interface 730, a bus interface, and a computer program that is stored in the memory 720 and capable of running on the processor 700. The processor 700 is configured to read the program in the memory 720 to perform the following process:

receiving a reconfiguration message of cell change configuration information that is sent by a source node; and sending a reconfiguration complete message to the source node.

In FIG. 7, a bus architecture may include any quantity of interconnected buses and bridges, and specifically connect together various circuits of one or more processors represented by the processor 700 and a memory represented by the memory 720. The bus architecture may further connect, for example, a peripheral or a voltage stabilizer to various other circuits such as a power management circuit. These are well known in the art, and therefore are not further described in this specification. The bus interface provides an interface. The transceiver 710 may be a plurality of elements, including a transmitter and a receiver, and provides units configured to communicate with various other apparatuses over a transmission medium. For different user equipment, the user interface 730 may be an interface capable of externally or internally connecting a required device. A connected device includes but is not limited to a keypad, a display, a speaker, a microphone, a joystick, or the like.

The processor 700 is responsible for management of the bus architecture and general processing, and the memory 720 may store data used by the processor 700 when the processor 700 performs an operation.

Optionally, the processor 700 reads the program in the memory 720 and is further configured to:

receive a reconfiguration instruction message of cell change configuration information that is sent by the source node or a target node, where the reconfiguration instruction message is used to instruct the terminal to delete or change current cell change configuration information.

Optionally, the processor 700 reads the program in the memory 720 and is further configured to:

delete the current cell change configuration information; or suspend current measurement.

Optionally, the reconfiguration message includes at least one cell change command.

The reconfiguration complete message includes an indication of reconfiguration completion for the reconfiguration message and validity of the cell change command.

Optionally, the reconfiguration message includes at least one cell change command.

The processor 700 reads the program in the memory 720 and is further configured to:

when a trigger condition of cell change is met, initiate a synchronization process and a random access process to a first target node based on the cell change command, where the trigger condition of the cell change is a trigger condition of a preset cell of the first target node.

Figure 8:
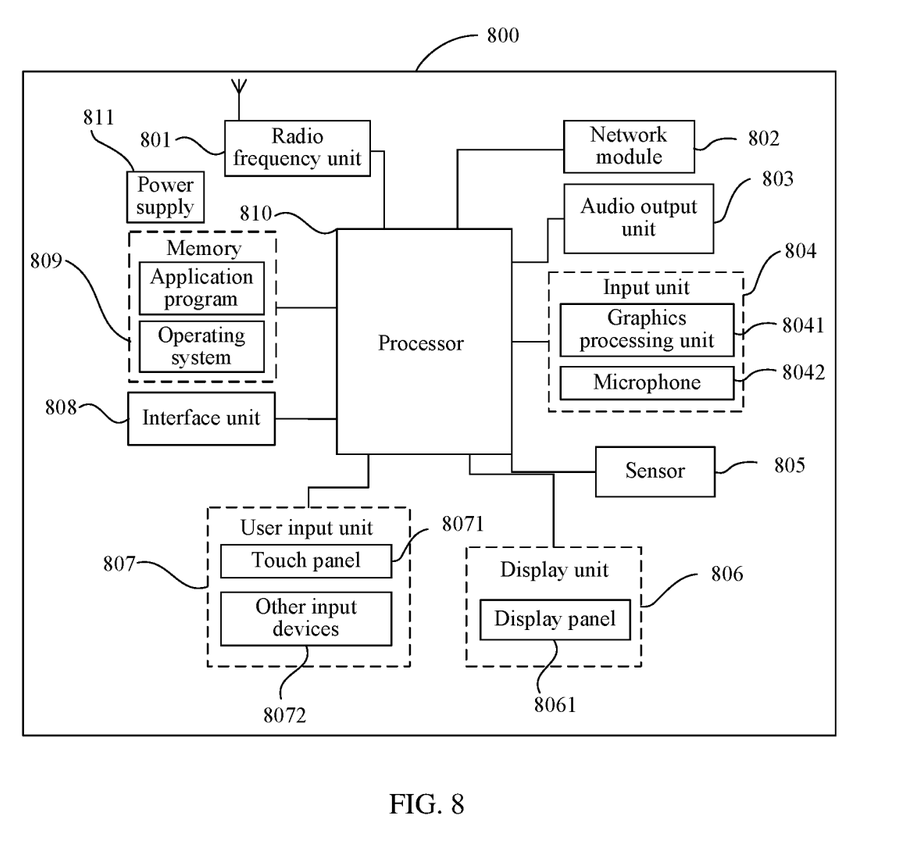
FIG. 8 is a second structural block diagram of a terminal according to an embodiment of this disclosure.

FIG. 8 is a schematic structural diagram of hardware of a terminal according to an embodiment of this disclosure. The terminal 800 includes but is not limited to: parts such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art can understand that the terminal structure shown in FIG. 8 does not constitute any limitation on the terminal, and the terminal may include components more or fewer than those shown in the figure, a combination of some components, or components disposed differently. In this embodiment of this disclosure, the terminal includes but is not limited to a mobile phone, a tablet computer, a notebook computer, a palmtop computer, a vehicle-mounted terminal, a wearable device, and a pedometer.

The processor 810 is configured to: receive a reconfiguration message of cell change configuration information that is sent by a source node; and send a reconfiguration complete message to the source node.

In the foregoing technical solutions in this embodiment of this disclosure, based on the reconfiguration message sent by the source node, configuration change, deletion, addition, and the like can be still implemented for the configuration after the conditional cell change configuration.

It should be understood that in this embodiment of this disclosure, the radio frequency unit 801 may be configured to: receive and send signals in an information receiving/sending process or a call process; and specifically, after receiving downlink data from a network device, send the downlink data to the processor 810 for processing, and in addition, send uplink data to the network device. Generally, the radio frequency unit 801 includes but is not limited to an antenna, at least one amplifier, a transceiver, a coupler, a low noise amplifier, a duplexer, and the like. In addition, the radio frequency unit 801 may also communicate with a network and another device through a wireless communications system.

The terminal provides a user with wireless broadband Internet access by using the network module 802. For example, the terminal helps the user send and receive emails, browse web pages, and access streaming media.

The audio output unit 803 can convert, into audio signals, the audio data that is received by the radio frequency unit 801 or the network module 802 or stored in the memory 809, and output the audio signals as sounds. In addition, the audio output unit 803 may further provide audio output related to a specific function performed by the terminal 800 (for example, a call signal received sound or a message received sound). The audio output unit 803 includes a speaker, a buzzer, a receiver, and the like.

The input unit 804 is configured to receive audio or video signals. The input unit 804 may include a graphics processing unit (Graphics Processing Unit, GPU) 8041 and a microphone 8042. The graphics processing unit 8041 processes image data of a static picture or a video obtained by an image capture apparatus (such as a camera) in a video capture mode or an image capture mode. A processed image frame may be displayed on the display unit 806. An image frame processed by the graphics processor 8041 may be stored in the memory 809 (or another storage medium) or sent by using the radio frequency unit 801 or the network module 802. The microphone 8042 can receive a sound and process the sound into audio data. The processed audio data can be converted into a format in which the audio data can be sent to a mobile communications network device through the radio frequency unit 801 for output in a telephone call mode.

The terminal 800 further includes at least one sensor 805, such as a light sensor, a motion sensor, and other sensors. Specifically, the light sensor includes an ambient light sensor and a proximity sensor. The ambient light sensor may adjust luminance of a display panel 8061 based on brightness of ambient light. The proximity sensor may turn off the display panel 8061 and/or backlight when the terminal 800 is moved to an ear. As a type of motion sensor, an accelerometer sensor can detect magnitudes of accelerations in all directions (usually three axes), can detect a magnitude and a direction of gravity when the mobile phone is in a static state, and can be configured to recognize a terminal posture (such as screen switching between a portrait mode and a landscape mode, a related game, and magnetometer posture calibration), a function related to vibration recognition (such as a pedometer or tapping), and the like. The sensor 805 may further include a fingerprint sensor, a pressure sensor, an iris sensor, a molecular sensor, a gyroscope, a barometer, a hygrometer, a thermometer, or an infrared sensor. Details are not described herein.

The display unit 806 is configured to display information input by the user or information provided for the user. The display unit 806 may include the display panel 8061. The display panel 8061 may be configured in a form of a liquid crystal display (Liquid Crystal Display, LCD), an organic light-emitting diode (Organic Light-Emitting Diode, OLED), or the like.

The user input unit 807 may be configured to receive input digits or character information, and generate key signal input related to a user setting and function control of the terminal. Specifically, the user input unit 807 includes a touch panel 8071 and other input devices 8072. The touch panel 8071, also referred to as a touchscreen, may capture a touch operation performed by a user on or near the touch panel (for example, an operation performed by the user on or near the touch panel 8071 by using any appropriate object or accessory such as a finger or a stylus). The touch panel 8071 may include two parts: a touch detection apparatus and a touch controller. The touch detection apparatus detects a touch direction of the user, detects a signal caused by a touch operation, and transmits the signal to the touch controller. The touch controller receives touch information from the touch detection apparatus, converts the touch information to touch point coordinates, sends the touch point coordinates to the processor 810, and receives a command sent by the processor 810 and executes the command. In addition, the touch panel 8071 may be implemented in a plurality of forms, for example, as a resistive, capacitive, infrared, or surface acoustic wave touch panel. The user input unit 807 may further include other input devices 8072 in addition to the touch panel 8071. Specifically, the other input devices 8072 may include but are not limited to a physical keyboard, a function key (such as a volume control key or a power on/off key), a trackball, a mouse, and a joystick. Details are not described herein again.

Further, the touch panel 8071 may cover the display panel 8061. After detecting a touch operation on or near the touch panel 8071, the touch panel 8071 transmits information about the touch operation to the processor 810 to determine a touch event type, and then the processor 810 provides a corresponding visual output on the display panel 8061 based on the touch event type. In FIG. 8, the touch panel 8071 and the display panel 8061 are used as two independent components to implement input and output functions of the terminal. However, in some embodiments, the touch panel 8071 may be integrated with the display panel 8061 to implement the input and output functions of the terminal. This is not specifically limited herein.

The interface unit 808 is an interface for connecting a peripheral to the terminal 800. For example, the peripheral may include a wired or wireless headset port, an external power (or battery charger) port, a wired or wireless data port, a memory card port, a port for connecting a device with a recognition module, an audio input/output (I/O) port, a video I/O port, a earphone port, and the like. The interface unit 808 may be configured to receive input (for example, data information or power) from the external apparatus, and transmit the received input to one or more elements in the terminal 800, or may be configured to transmit data between the terminal 800 and the external apparatus.

The memory 809 may be configured to store a software program and various data. The memory 809 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 809 may include a high-speed random access memory, or may alternatively include a non-volatile memory, for example, at least one magnetic disk storage device, a flash memory device, or another volatile solid-state storage device.

The processor 810 is a control center of the terminal, and is connected to various parts of the entire terminal by using various interfaces and lines. By running or executing a software program and/or module that is stored in the memory 809 and invoking data stored in the memory 809, the processor 810 performs various functions of the terminal and processes data, so as to perform overall monitoring on the terminal. The processor 810 may include one or more processing units. Optionally, an application processor and a modem processor may be integrated into the processor 810. The application processor mainly processes an operating system, a user interface, an application program, and the like. The modem processor mainly processes wireless communication. It may be understood that the modem processor may alternatively not be integrated into the processor 810.

The terminal 800 may further include the power supply 811 (such as a battery) that supplies power to each component. Optionally, the power supply 811 may be logically connected to the processor 810 by using a power management system, to implement functions such as charge management, discharge management, and power consumption management by using the power management system.

In addition, the terminal 800 includes some functional modules that are not shown. Details are not described herein.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

Through the description of the foregoing implementations, a person skilled in the art can clearly appreciate that the methods in the foregoing embodiments may be implemented by using software on a necessary general-purpose hardware platform, and certainly may be implemented by hardware. However, in many cases, the former is a more preferred implementation. Based on such an understanding, the technical solutions in this disclosure essentially or the part contributing to the prior art may be embodied in the form of a software product. The computer software product is stored in a storage medium (such as a ROM/RAM, a magnetic disk, or an optical disc) and includes several instructions for instructing a terminal (which may be a mobile phone, a server, an air conditioner, a network device, or the like) to perform the methods in the embodiments of this disclosure.

The embodiments of this disclosure are described above with reference to the accompanying drawings, but this disclosure is not limited to the foregoing implementations.

The foregoing embodiments are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A reconfiguration method, comprising:
    sending, by a first network node, a reconfiguration request of cell change configuration information to a second network node, wherein the reconfiguration request comprises: a change request or a deletion request or an addition request of cell change configuration information; and
    obtaining, by the first network node, a reconfiguration response sent by the second network node based on the reconfiguration request;
    wherein the cell change configuration information comprises at least one of the following items:
    an association relationship between a trigger condition, a cell identifier, measurement, and a cell change command; and
    measurement configuration;
    wherein when the first network node is a source node and the second network node comprises at least one target node, after the step of obtaining, by the first network node, a reconfiguration response sent by the second network node based on the reconfiguration request, the method further comprises:
    sending, by the first network node, a reconfiguration message of cell change configuration information to a terminal based on the reconfiguration response;
    after receiving a reconfiguration complete message sent by the terminal, notifying, by the first network node, the second network node of reconfiguration completion of the cell change configuration information;
    wherein the second network node comprises a first target node and a second target node; and after the notifying the second network node of reconfiguration completion of the cell change configuration information, the method further comprises:
    sending, by the first network node, a resource release notification to the second target node when receiving a notification that the terminal meets a trigger condition of the cell change, wherein the trigger condition of the cell change is a trigger condition of a preset cell of the first target node;
    wherein
    the resource release notification is used to instruct the second target node to release a resource corresponding to target configuration information; and the target configuration information is configuration information other than executed configuration information in the cell change configuration information of the terminal.

2. The reconfiguration method according to claim 1, wherein before the step of obtaining, by the first network node, a reconfiguration response sent by the second network node based on the reconfiguration request, the method further comprises:
    sending, by the first network node, a reconfiguration instruction message of cell change configuration information to a terminal, wherein
    the reconfiguration instruction message is used to instruct the terminal to delete or change current cell change configuration information.

3. The reconfiguration method according to claim 1, wherein when the reconfiguration request is a change request of cell change configuration information, the reconfiguration response comprises at least one of: accepting change, not accepting change, accepting part of requested change, not accepting part of requested change, a cause value, and accepting unconditionally; or when the reconfiguration request is a deletion request of cell change configuration information, the reconfiguration response comprises at least one of: accepting deletion, not accepting deletion, accepting part of requested deletion, not accepting part of requested deletion, a cause value, and accepting unconditionally.

4. The reconfiguration method according to claim 3, wherein the step of sending, by the first network node, a reconfiguration message of cell change configuration information to a terminal based on the reconfiguration response comprises:

when the reconfiguration response comprises accepting change or accepting part of requested change, sending, by the first network node, the reconfiguration message of cell change configuration information to the terminal; or when the reconfiguration response comprises accepting deletion or accepting part of requested deletion, sending, by the first network node, the reconfiguration message of cell change configuration information to the terminal.

5. The reconfiguration method according to claim 4, wherein the reconfiguration message comprises at least one of the following items:

at least one cell change command;

condition configuration information;

a cell identifier; and an association relationship between the cell identifier, the condition configuration information, and the cell change command.

6. The reconfiguration method according to claim 1, wherein when the reconfiguration message comprises at least one cell change command, the reconfiguration complete message comprises an indication of reconfiguration completion for the reconfiguration message and validity of the cell change command.

7. A reconfiguration method, comprising:

receiving a reconfiguration message of cell change configuration information that is sent by a source node, wherein the reconfiguration message is sent by the source node based on a reconfiguration response sent by a target node, the reconfiguration response is sent by the target node based on a reconfiguration request of cell change configuration information sent by the source node, and the reconfiguration request comprises: a change request or a deletion request or an addition request of cell change configuration information; and sending a reconfiguration complete message to the source node;

wherein the reconfiguration message comprises at least one cell change command; and after the sending the reconfiguration complete message to the source node, the method further comprises:

when a trigger condition of cell change is met, initiating a synchronization process and a random access process to a first target node based on the cell change command, wherein the trigger condition of the cell change is a trigger condition of a preset cell of the first target node;

wherein the cell change configuration information comprises at least one of the following items:

an association relationship between a trigger condition, a cell identifier, measurement, and a cell change command; and measurement configuration.

8. The reconfiguration method according to claim 7, wherein before the step of receiving a reconfiguration message of cell change configuration information that is sent by a source node, the method further comprises:

receiving a reconfiguration instruction message of cell change configuration information that is sent by the source node or a target node, wherein the reconfiguration instruction message is used to instruct the terminal to delete or change current cell change configuration information.

9. The reconfiguration method according to claim 8, wherein after the receiving a reconfiguration instruction message of cell change configuration information that is sent by the source node, the method further comprises:

deleting the current cell change configuration information; or suspending current measurement.

10. The reconfiguration method according to claim 7, wherein the reconfiguration message comprises at least one cell change command; and the reconfiguration complete message comprises an indication of reconfiguration completion for the reconfiguration message and validity of the cell change command.

11. A network device, comprising: a memory, a processor, and a computer program that is stored in the memory and capable of running on the processor, wherein the computer program is executed by the processor to perform:

sending a reconfiguration request of cell change configuration information to a second network node, wherein the reconfiguration request comprises: a change request or a deletion request or an addition request of cell change configuration information; and obtaining a reconfiguration response sent by the second network node based on the reconfiguration request;

wherein the cell change configuration information comprises at least one of the following items:

an association relationship between a trigger condition, a cell identifier, measurement, and a cell change command; and measurement configuration;

wherein when the first network node is a source node and the second network node comprises at least one target node, after the step of obtaining, by the first network node, a reconfiguration response sent by the second network node based on the reconfiguration request, the computer program is executed by the processor to further perform:

sending, by the first network node, a reconfiguration message of cell change configuration information to a terminal based on the reconfiguration response;

after receiving a reconfiguration complete message sent by the terminal, notifying, by the first network node, the second network node of reconfiguration completion of the cell change configuration information;

wherein the second network node comprises a first target node and a second target node; and after the notifying the second network node of reconfiguration completion of the cell change configuration information, the computer program is executed by the processor to further perform:

sending, by the first network node, a resource release notification to the second target node when receiving a notification that the terminal meets a trigger condition of the cell change, wherein the trigger condition of the cell change is a trigger condition of a preset cell of the first target node;

wherein the resource release notification is used to instruct the second target node to release a resource corresponding to target configuration information; and the target configuration information is configuration information other than executed configuration information in the cell change configuration information of the terminal.

12. The network device according to claim 11, wherein before the step of obtaining a reconfiguration response sent by the second network node based on the reconfiguration request, the computer program is executed by the processor to perform:

sending a reconfiguration instruction message of cell change configuration information to a terminal, wherein the reconfiguration instruction message is used to instruct the terminal to delete or change current cell change configuration information.

13. A terminal, comprising: a memory, a processor, and a computer program that is stored in the memory and capable of running on the processor, wherein when the computer program is executed by the processor, the steps of the reconfiguration method according to claim 7 are implemented.

* * * * *